Patented Feb. 10, 1925.

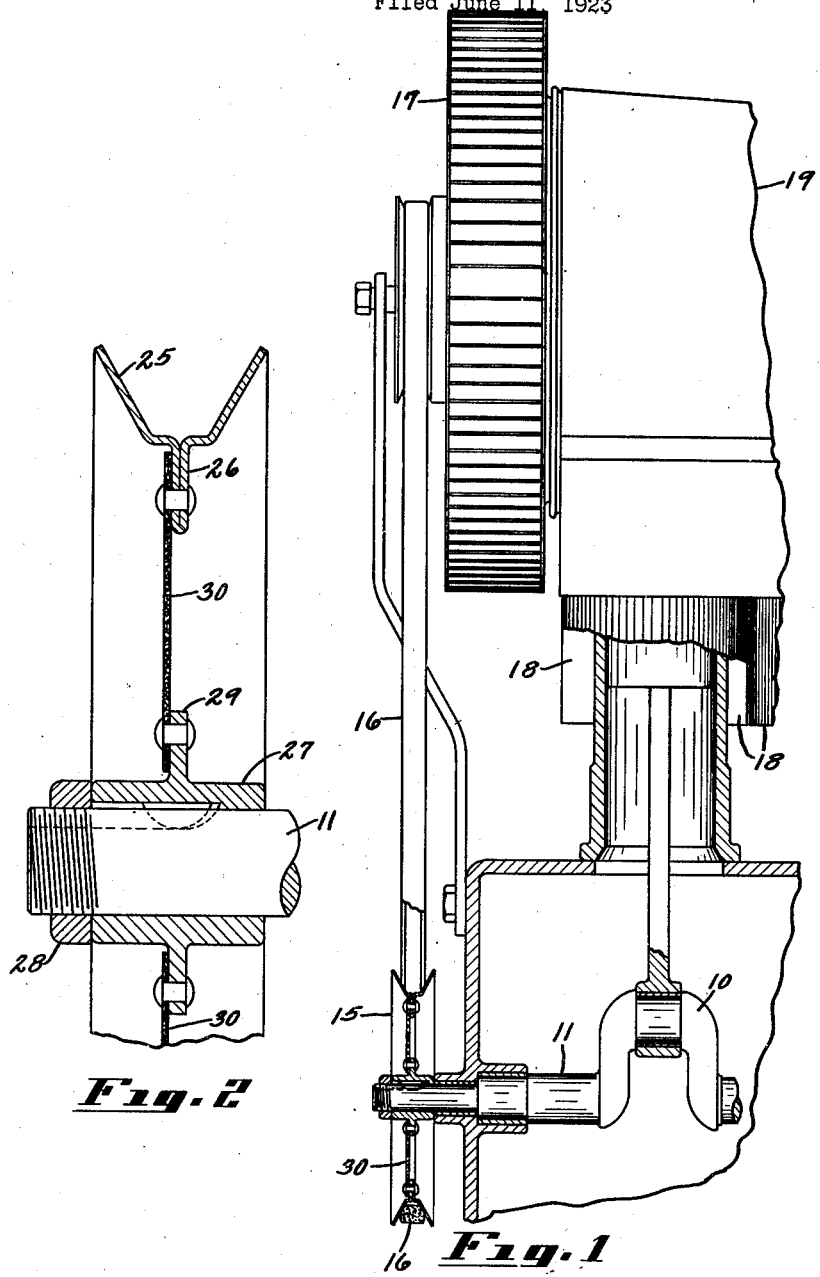

1,525,717

UNITED STATES PATENT OFFICE.

JOSEPH E. BUTZ, OF DAYTON, OHIO, ASSIGNOR TO GENERAL MOTORS RESEARCH CORPORATION, OF DAYTON, OHIO, A CORPORATION OF DELAWARE.

MEANS FOR DAMPING TORSIONAL VIBRATIONS.

Application filed June 11, 1923. Serial No. 644,823.

*To all whom it may concern:*

Be it known that I, JOSEPH E. BUTZ, a citizen of the United States of America, residing at Dayton, county of Montgomery, and State of Ohio, have invented certain new and useful Improvements in Means for Damping Torsional Vibrations, of which the following is a full, clear, and exact description.

This invention relates to a means for damping torsional vibrations in a rotating shaft and is especially applicable to the crank shaft of an internal combustion engine.

Ordinarily the crank shaft of an internal combustion engine has a flywheel at only one end of the crank shaft thereof, and this flywheel is of necessity placed a considerable distance from the most distant crank throw in multicylinder engines. Therefore when this most distant crank throw (which will hereinafter be designated as No. 1 throw) receives the power impulse from its piston, torque will be transmitted through the crank shaft from No. 1 throw back to the heavy flywheel and since the polar moment of inertia of the crank shaft is very small compared to that of the flywheel the crank shaft will yield to the torsional stress a slight amount. In other words the flywheel tends to hold that end of the crank shaft relatively stationary while the power impulse on No. 1 throw twists the shaft. Of course the power impulses on the other crank pins also twist the crank shaft to a certain degree depending on their distance from the flywheel. Since the crank shaft is made of highly elastic material these twisting impulses set up torsional vibrations in the shaft, the natural period of which of course depends upon the design of the shaft itself, according to the well known laws of a torsional pendulum. It has been found that at certain engine speeds the power impulses on the crank throw occur at substantially the same time period or a multiple of the time period of the torsional vibrations of the shaft. When this occurs the power impulses will soon become substantially in phase with the torsional vibrations and so build them up to objectionable proportions.

Now the object of this invention is to provide means which will absorb the energy of these torsional vibrations and so prevent the vibrations from becoming excessive at any engine speed.

Another object is to accomplish this result in a very simple manner when used with an internal combustion engine by making only slight changes in the construction of parts which are ordinarily already present, so that no additional parts must be provided.

Further objects and advantages of the present invention will be apparent from the following description, reference being had to the accompanying drawings, wherein a preferred form of embodiment of the present invention is clearly shown.

In the drawings:

Fig. 1 shows in section the front end of a multicylinder internal combustion engine and the fan pulley which embodies this invention.

Fig. 2 is a detail view on an enlarged scale of the fan pulley.

In the drawing, similar reference characters refer to similar parts throughout the several views.

The particular engine illustrated in the drawing is a multicylinder air cooled engine, only the front throw 10 of the crank shaft 11 being shown, it not being deemed necessary to show the entire engine and the flywheel at the opposite end of the crank shaft 11. The engine may be of any conventional or desired design and the crank shaft may be provided with counterweights opposite the throws or not, as seen fit. When such counterweights are provided the effect is to greatly lower the period of the torsional vibrations in the crank shaft so that resonance between the power impulses and the torsional vibrations will occur at a much lower engine speed.

The front end of the crank shaft 11 has keyed thereto the pulley wheel 15 which drives the centrifugal fan 17 through the flexible belt 16. The centrifugal fan 17 draws cooling air up through the cooling fins 18 on the engine cylinders, through the draft tube 19 extending along the tops of the cylinders, and then exhausts the air around the periphery of the fan wheel, all in a manner well known prior to this invention.

Now according to this invention the pulley wheel 15 is made up of a rigid peripheral portion 25 which serves as a driving means for the belt 16, and a yieldable imperfectly elastic central portion 30 which absorbs the energy of the torsional vibrations in the crank shaft and thus damps them out. The rim portion 25 is shown as made up from sheet metal bent to a V-section and having a flange 26 projecting radially inwardly on the inner periphery of the rim portion 25. The hub portion 27 is provided with suitable means, such as a key and keyway, for non-rotatably mounting it upon the front end of the crank shaft 11. A nut 28 is shown for holding the hub 27 from axial displacement. Hub 26 is also provided with a circular flange 29 for the convenient attachment thereto of the yieldable disk 30. The disk 30 may be secured to the flanges 26 and 29 by any suitable means other than by the rivets shown, for instance, by clamping rings bolted to the flanges 26 and 29. The disk 30 may be made of any suitable material which has the desired properties of yieldability and mechanical hysteresis, that is, it should have a considerable amount of internal friction so that when it is made to yield by some force a considerable part of the work done upon it is absorbed by the material itself. Various forms of fabric material may be used, or fabric impregnated with rubber or similar material, or rubber material reinforced with textile material. Also instead of having a thin disk 30 as shown in Fig. 2 the disk may have any suitable thickness depending upon the kind of material of which it is made and the torque which it must transmit.

While the form of embodiment of the present invention as herein disclosed, constitutes a preferred form, it is to be understood that other forms might be adopted, all coming within the scope of the claims which follow.

What I claim is as follows:

1. Means for damping torsional vibrations in a shaft comprising a wheel whose hub is rigidly keyed to the shaft and whose rim is connected to said hub by a torsionally yieldable diaphragm.

2. Means for damping torsional vibrations in a shaft comprising, a wheel rim running at substantially uniform peripheral velocity, and a flexible means for connecting said rim to the shaft, whereby the internal friction in said flexible means will damp out the torsional vibrations of said shaft.

3. Means for damping torsional vibrations in a shaft comprising, a wheel rim running at substantially uniform peripheral velocity, and a flexible diaphragm having mechanical hysteresis for connecting said rim to the shaft, whereby the internal friction in said flexible diaphragm will damp out the torsional vibrations of said shaft.

4. Means for damping torsional vibrations in a shaft comprising, a wheel rim running at substantially uniform peripheral velocity, and a flexible non-metallic disk for connecting said rim to the shaft, whereby the internal friction in said flexible disk will damp out the torsional vibrations of said shaft.

5. In an internal combustion engine having a crank shaft, in combination, a wheel having a yieldable imperfectly elastic material connecting its peripheral portion to its central portion, said wheel having its central portion fixed to said crank shaft, and a power absorbing device driven by the peripheral portion of said wheel, whereby the torsional vibrations of the crank shaft are damped.

In testimony whereof I hereto affix my signature.

JOSEPH E. BUTZ.

Witnesses:
 Geo. E. Pasco,
 Wm. P. Pasco.